United States Patent Office 2,797,645
Patented July 2, 1957

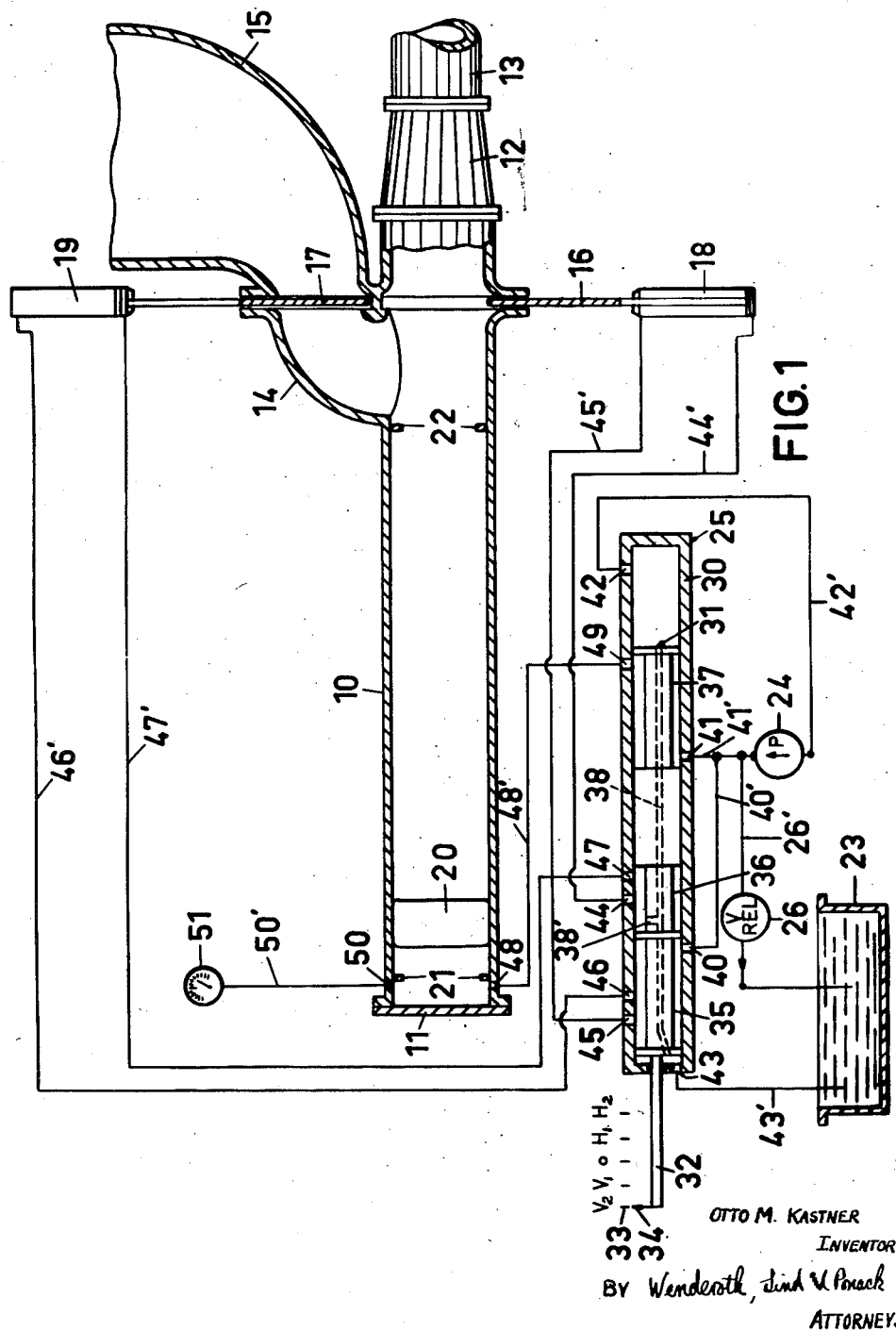

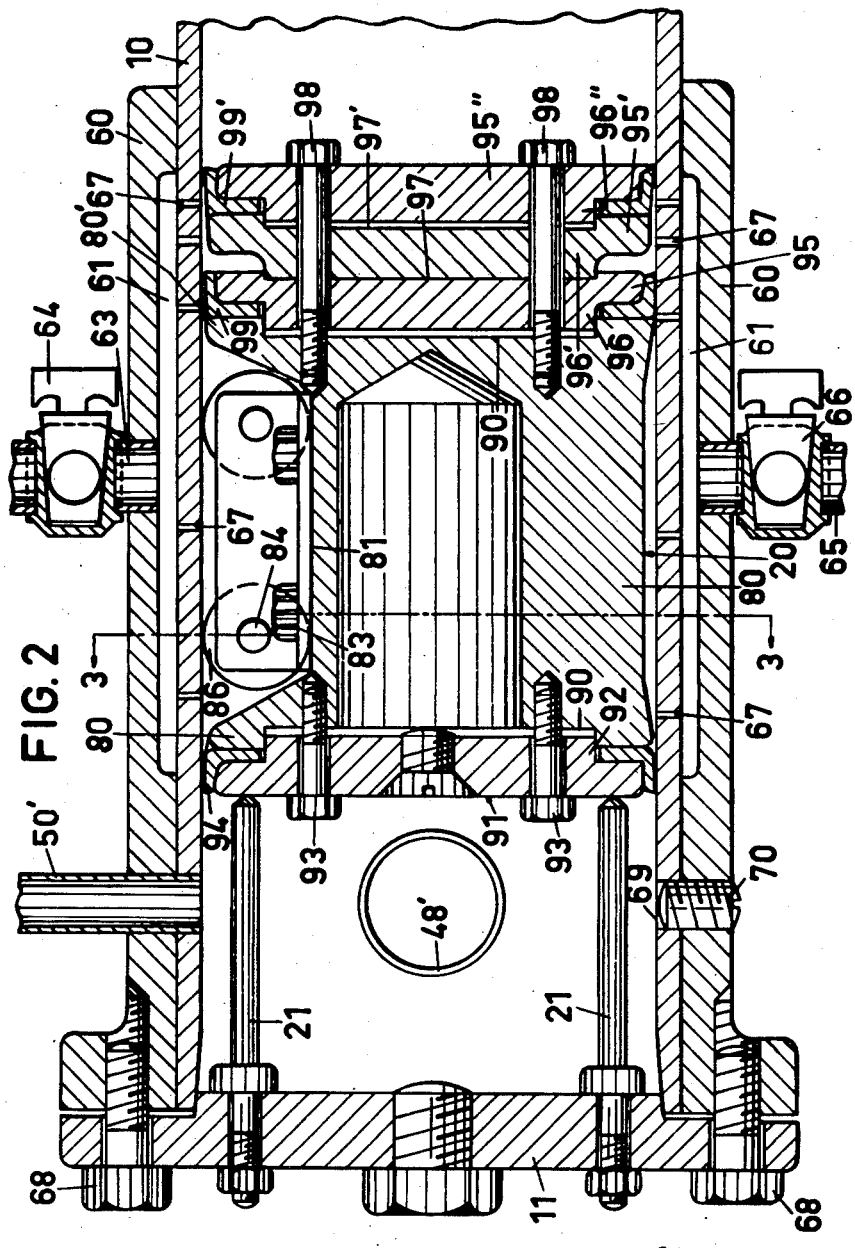

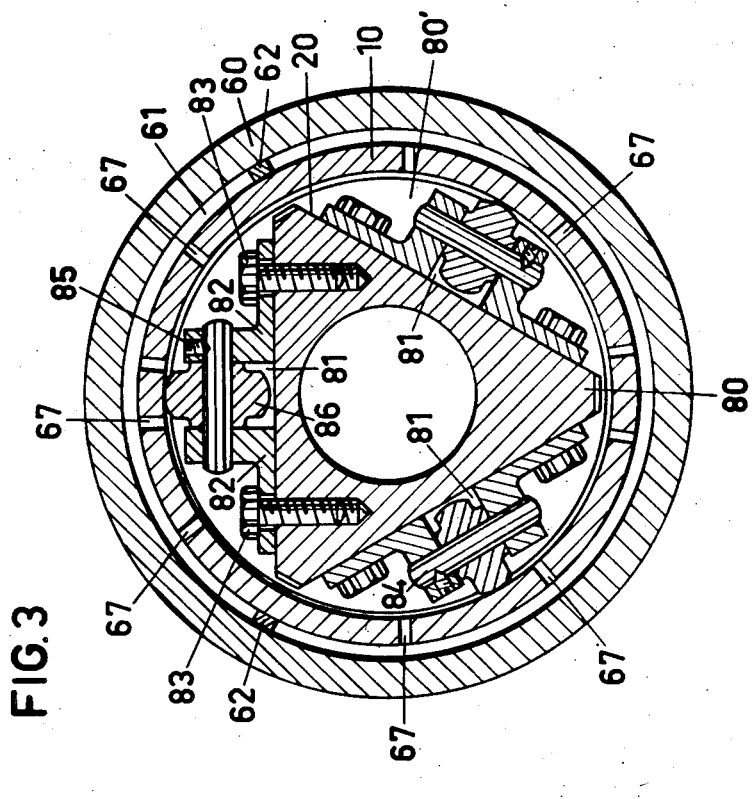

2,797,645

CONVEYOR PUMPS FOR VISCID MASSES

Otto Max Kästner, Witten-Annen, Ruhr, Germany, assignor to Aktiebolaget Skanska Cementgjuteriet, Malmo, Sweden, a corporation of Sweden Application May 13, 1954, Serial No. 429,618

3 Claims. (Cl. 103—52)

The present invention relates to conveyor pumps for viscid masses, especially grout and more particularly to a pump comprising a cylinder, a piston reciprocable therein, and means forming a feed opening and a discharge opening for the mass to be conveyed, said means being disposed at one end of said cylinder and the flow through said openings being controlled by valves.

It is an object with the present invention to provide a novel conveyor pump of the above character in which the piston is reciprocated with long steady strokes thus avoiding short rapid acceleration of the mass to be conveyed.

It is another object to provide such a conveyor pump in which the piston is freely movable axially in the cylinder and in which the cylinder at the end opposite to said one end is provided with means for admitting a fluid under pressure to the cylinder and for drawing off such fluid from the cylinder for reciprocating said piston in the cylinder by the pressure and the suction, respectively, applied by said fluid.

A further object with the invention is to provide means for actuating said valves according to the reversal of the direction of flow of said fluid.

A still further object is to provide means for washing said piston in the cylinder, thereby removing dirt and small particles adhering to the piston.

A still further object is to provide a piston of a novel construction and with rollers supporting the piston on the inner surface of said cylinder.

Further objects and advantages will be apparent from the following description taken in connection with the accompanying drawings in which:

Fig. 1 is a diagrammatic representation of the pump in one preferred embodiment of the invention with hydraulic servo-motors for actuating the valves and a sliding type valve for controlling the hydraulic servomotors;

Fig. 2 is a vertical sectional view taken axially through the piston and part of the cylinder at one end thereof and illustrating a constructive embodiment of the invention; and Fig. 3 is a sectional view on line 3—3 of Fig. 2.

In Fig. 1 of the drawings there is illustrated a conveyor pump, comprising a cylinder 10 closed at one end by a disc 11 and preferably inclined upward towards its other end at which the cylinder is connected to a tapered pipe section 12 attached to a conveyor pipe 13. Near said other end the cylinder 10 is provided with a branch pipe 14, by which it communicates with a container 15 for the mass to be conveyed by the pump. The communication between the cylinder 10 on one hand and the pipe 13 and the container 15 on the other is controlled by valves 16 and 17, respectively, said valves being displaceable between open and closed positions by hydraulic servomotors 18 and 19, respectively. The cylinder 10 contains a piston 20 which is freely movable axially therein and in its end positions engages stops 21 and 22, respectively. The piston 20 is adapted to be reciprocated in the cylinder by a fluid which is forced into and drawn off from the space of the cylinder 10 between the piston 20 and the disc 11.

As seen in Fig. 1 this is accomplished by a hydraulic system which is also connected with the hydraulic servomotors 18 and 19, respectively, of the two valves 16 and 17. The hydraulic system comprises a fluid reservoir diagrammatically shown at 23, a fluid pump 24, a control valve 25, and a relief valve 26 connected with one another and with the cylinder 10 and the servomotors by pipes, shown as lines only. The hydraulic fluid is preferably water.

The control valve 25 is of the sliding type and comprises a cylindrical valve housing 30 with a reciprocable slide valve 31 therein, said slide valve being connected with an operating bar 32 for manually reciprocating the slide valve, said bar extending through an opening in one end of the valve housing 30. There are five different positions for the slide valve 31 which in Fig. 1 of the drawing are indicated by a scale 33 and designated V2, V1, 0, H1, and H2, an index 34 on the bar 32 being adapted to indicate the actual position of the slide valve 31. In Fig. 1 the slide valve is in its extreme left hand position V2. The slide valve 31 is formed with three annular grooves 35, 36, and 37 and is provided with an axially extending duct 38 permanently communicating with the groove 36 at 38' and with the interior of the valve housing 30 at the ends of the slide valve 31. The outlet of the pump 24 is connected with openings 40 and 41 in the valve housing 30 by pipes 40' and 41' and to the reservoir 23 by a pipe 26', the fluid flow through the pipe 26' being controlled by the relief valve 26 therein. The inlet of the pump 24 is connected with an opening 42 in the valve housing 30 by a pipe 42'. One end of the housing 30 also communicates with the reservoir 23 through an opening 43 and a pipe 43'.

By openings 44 and 45 in the housing 30 and pipes 44' and 45' connected therewith the control valve is connected with the servomotor 18 and by openings 46 and 47 in the housing 30 and pipes 46' and 47' with the servomotor 19 for delivering fluid to and draining off fluid from the cylinders of the respective servomotors on both sides of the piston of the servomotor. The cylinder 10 is connected with an opening 49 in the housing 30 by an opening 48 in the cylinder wall and a pipe 48' and with a pressure gauge 51 by an opening 50 and a pipe 50', said gauge being arranged to indicate positive and negative pressures in the cylinder 10.

In all positions of the slide valve 31 the groove 35 communicates with the output of the fluid pump 24 by the opening 40 and the pipe 40'. Assuming the slide valve 31 is in the centre position indicated by 0 the two servo-motors 18 and 19 are supplied with fluid under pressure from the output of the fluid pump 24 by the passages 40', 40, 35, 44, 44', and 40', 40, 35, 46, 46', respectively, at one end of the respective servo-motors, the other end of the servo-motor being connected with reservoir 23 by the passages 45', 45, 43, 43' and 47', 47, 36, 38', 38, 43, 43', the valves 16 and 17 thus being in their closed positions. The fluid pump 24 is connected to the fluid reservoir 23 by the passages 42', 42, 38, 43, 43'. If the slide valve 31 is displaced to the right as viewed in Fig. 1 to the position designated by H1, the servo-motor 19 is connected to the reservoir 23 by the passages 46', 46, 43, 43' and to the outlet of the fluid pump 24 by the passages 47', 47, 35, 40, 40'. Thereby, the servo-motor 19 is reversed and opens the valve 17. By further displacement of the slide valve 31 to the right into the position designated H2 the inlet of the pump 24 will be connected to the cylinder 10 by the passages 48, 48', 49, 37, 42, 42'. Assuming the piston initially was in its extreme right-hand position engaging the two stops 22 and the cylinder 10 was filled with fluid in the space between the piston 20 and the disc 11, this fluid will now be drawn off from the cylinder by the fluid pump 24. Thereby, the piston 20 will be displaced to the left and mass from the container 15 will flow past the open valve 17 and through the branch pipe 14 into the cylinder 10.

When the piston 20 has reached its extreme left-hand position and engages the two stops 21 the slide valve is brought to the centre position, thereby interrupting the drawing off of fluid from the cylinder 10 and causing the valve 17 to be closed.

If the slide valve 31 is displaced to the left to the position V1 the servo-motor 18 will be connected to the outlet of the fluid pump 24 by the passages 45′, 45, 35, 40, 40′ and with the reservoir 23 by the passages 44′, 44, 36, 38′, 43, 43′, thereby reversing the servo-motor 18. Thus the valve 16 will be brought to its open position. If the slide valve 31 is displaced to the position V2, shown in Fig. 1 of the drawings the outlet of the fluid pump 24 will also be connected to the cylinder 10 by the passages 41′, 41, 37, 49, 48′, 48, whereby the piston 20 will be moved to the right into engagement with the stops 22 and force the mass, previously drawn into the cylinder 10, past the open valve 16 into the pipe 13.

The relief valve 26 is adapted to connect the outlet of the fluid pump 24 with the reservoir 23 by the pipe 26′ when the pressure in the outlet of the pump 24 exceeds a predetermined value.

In Figs. 2 and 3 of the drawings there is shown a constructive embodiment of the cylinder 10 and the piston 20, only part of the cylinder is shown, viz. the left end thereof as viewed in Fig. 1. At this end of the cylinder there is provided an outer casing 60 secured on the cylinder as by welding and formed with an annular inside cavity providing a space 61 between the outer surface of the cylinder 10 and the inner surface of the casing 60. This space is divided into two separate sections, and a lower one, by two partitions 62 secured as by welding on the cylinder and/or the casing 60, said upper section extending over approximately one third of the periphery of the cylinder and being adapted to be connected with a water supply by a pipe 63 and a cock 64, and said lower section of the space 61 being adapted to be connected with a suitable drain by a pipe 65 and a cock 66. The two sections of the space 61 are connected with the interior of the cylinder 10 by apertures 67. When the piston is in its extreme left hand position as viewed in Figs. 1 and 2 it may be washed with water by this arrangement, the water being supplied through the pipe 63 and the opened cock 64 to the upper section of the space 61. The water flows into the cylinder through the apertures 67 leading from the upper section of the space 61, and after washing the piston 20 the water leaves the cylinder 10 through the apertures 67 leading into the lower section of the space 61. The water then flows through the pipe 65 and the opened cock 66 to the drain, carrying away particles which, if not being washed away, would cause undue wear. During the reciprocation of the piston the two cocks 64 and 66 must be in their closed positions. The casing 60 may as well be disposed at the other extreme position of the piston 20 in a similar manner.

As seen in Fig. 2 the disc 11 is secured on the outer casing 60 by bolts 68 and carries the two stops 21 formed as pins which are bolted to the disc 11. In the lower part of the cylinder 10 there is provided a drain opening 69 normally closed by a screw plug 70 which is removable for draining off fluid from the cylinder 10 when the disc 11 is to be removed.

The piston 20 includes a body 80 which is triangular in cross section and has circular flanges 80′ at both ends. On each plane side surface 81 of the body 80 there are a pair of spaced angle elements 82 secured to the body 81 by bolts 83. Two shafts 84 extend through registering openings in the elements 82 and are each held in position by a stop screw 85 fitted into one of the angle elements 82 and engaging the shaft 84. Rotatably carried by each shaft 84 is a roller 86. These rollers support the piston 20 on the inside surface of the cylinder 10, thereby facilitating the reciprocation of the piston 20.

The piston body 80 is formed with a central circular cavity at each end thereof. A disc 91 with a central circular boss portion 92 fits displaceably with this portion 92 in the cavity 90 at one end of the body 80 and is fixed on the body 80 by screws 93, an annular packing sleeve 94 of resilient material being clamped between the disc 91 and the adjacent flange 80′.

In a similar manner a disc 95 is provided with a central circular boss portion 96 and is fitted into a cavity 90 at the other end of the body 80, this disc being formed, however, with a central circular cavity 97. A central circular boss portion 96′ of another disc 95′ fits displaceably in the said cavity 97. In a similar manner the disc 95′ is formed with a central circular cavity 97′, and a boss portion 96″ of a third disc 95″ fits displaceably into this cavity 97′. All the discs are secured on the body 80 by two screws 98, an annular packing sleeve 99 being clamped between the disc 95 and the adjacent flange 80′ and an annular packing sleeve 99′ being clamped between the discs 95′ and 95″.

It is not intended that the invention is to be limited to the embodiments described and shown on the drawings, as these embodiments are given as examples only. On the contrary it is intended to cover all modifications and adaptations falling within the spirit and scope of the invention as defined in the appended claims.

What I claim and desire to secure by Letters Patent is:

1. In combination with a pump cylinder, a piston reciprocable in said cylinder between two extreme end positions and comprising a piston body and rotatable rollers on said piston body supporting said piston on the inner surface of said cylinder, an outer casing secured on said cylinder at one of said extreme end positions of said piston defining an annular space between the outer surface of said cylinder and the inner surface of said outer casing, partitions in said annular space extending axially thereof and dividing the space into two separate sections, means connecting said separate sections through the cylinder wall with the interior of the cylinder, means on said casing for supplying liquid to one of said sections, and means on said casing for draining off such liquid from the other of said sections.

2. In combination with a pump cylinder, a piston reciprocable in said cylinder between two extreme end positions and comprising a piston body and rotatable rollers on said piston body supporting said piston on the inner surface of said cylinder, an outer cylindrical casing secured on said cylinder coaxially therewith at one of said extreme end positions of said piston defining an annular space between the outer surface of said cylinder and the inner surface of said outer casing, partitions in said annular space extending axially thereof and dividing the space into separate sections, an upper one and a lower one, the cylinder wall having a plurality of apertures therethrough connecting said separate sections with the interior of the cylinder, means on said casing for supplying liquid to the upper one of said sections, and means on said casing for draining off such liquid from the lower one of said sections.

3. In combination with a pump cylinder, a piston reciprocable in said cylinder between two extreme end positions and comprising a piston body, pairs of rollers circumferentially spaced on said piston body, said rollers supporting said piston on the inner surface of said cylinder, means for rotatably mounting said rollers on said piston body with the rollers of each of said pairs spaced axially of the piston, an outer casing secured on said cylinder at one of said extreme end positions of said piston defining an annular space between the outer surface of said cylinder and the inner surface of said outer casing, partitions in said annular space extending axially thereof and dividing the space into two separate sections, means connecting said separate sections through the cylinder wall with the interior of the cylinder, means on said casing for supplying liquid to one of said sections, and means on said casing for draining off such liquid from the other of said sections.

References Cited in the file of this atent

UNITED STATES PATENTS

| | | |
|---|---|---|
| 333,468 | Hutchinson | Dec. 29, 1885 |
| 632,950 | Spence et al. | Sept. 12, 1899 |
| 1,906,765 | Purkey | May 2, 1933 |
| 1,964,932 | Stoesling et al. | July 3, 1934 |
| 1,966,819 | Irvin | July 17, 1934 |
| 2,393,096 | Fitzgerald | Jan. 15, 1946 |
| 2,644,401 | Ragland | July 7, 1953 |